March 24, 1953  E. E. VINCENT  2,632,608
FISHING REEL

Filed July 21, 1949  2 SHEETS—SHEET 1

INVENTOR.
Edwin E. Vincent
BY
Chester A. Williams

March 24, 1953  E. E. VINCENT  2,632,608
FISHING REEL

Filed July 21, 1949   2 SHEETS—SHEET 2

INVENTOR.
Edwin E. Vincent
BY
Chester A. Williams

Patented Mar. 24, 1953

2,632,608

UNITED STATES PATENT OFFICE 2,632,608

FISHING REEL

Edwin E. Vincent, Springfield, Mass.

Application July 21, 1949, Serial No. 105,939

6 Claims. (Cl. 242—84.4)

The present invention relates to fishing reels and more particularly, to that type of fishing reel which is primarily adapted for the casting of lightweight lures.

It is a primary object of the present invention to provide a fishing reel which will permit a fishing line to run free from a normally stationary spool whenever a cast is made by the angler and, at the same time, provide a most efficient means for engaging and winding the line back upon the spool upon the completion of the cast.

A further object of the present invention is to provide a casting reel of the so-called spinning type which, although most efficient in operation, is designed in a manner such that will make for inexpensive manufacture and maintenance.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages obtained thereby will be readily understood by those skilled in the art. In the drawings, Fig. 1 represents a fishing rod having secured thereto a reel which incorporates therein the present invention.

Figure 3:
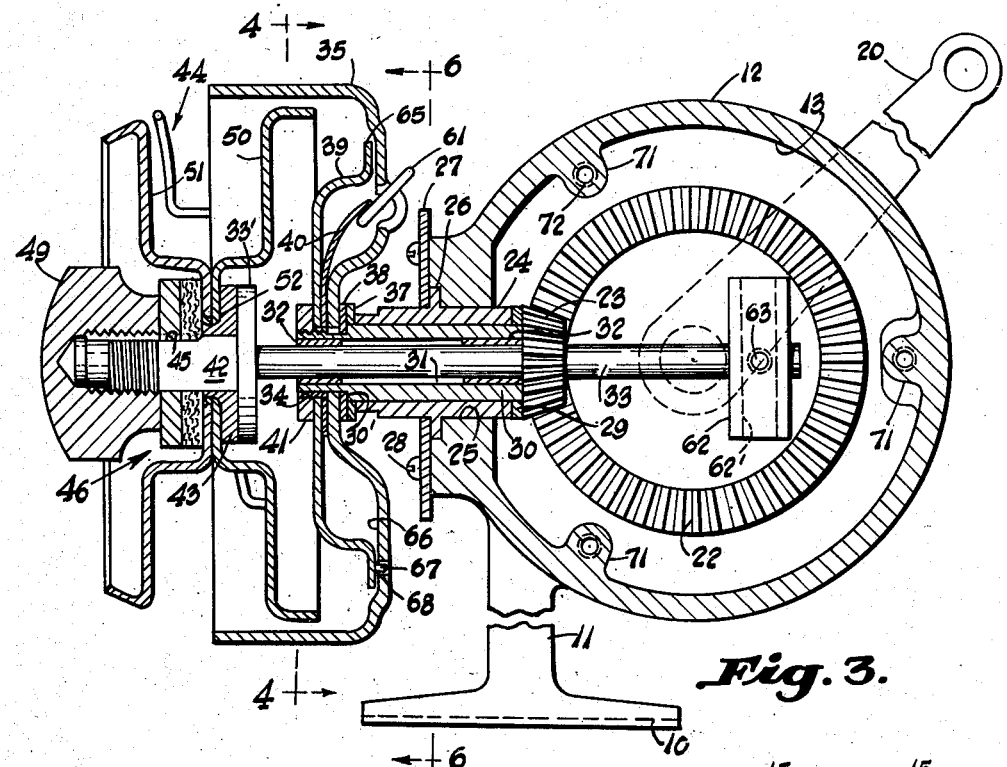
Fig. 3 represents, on an enlarged scale, a sectional view taken substantially along line 3—3 of Fig. 2.
Figure 1:
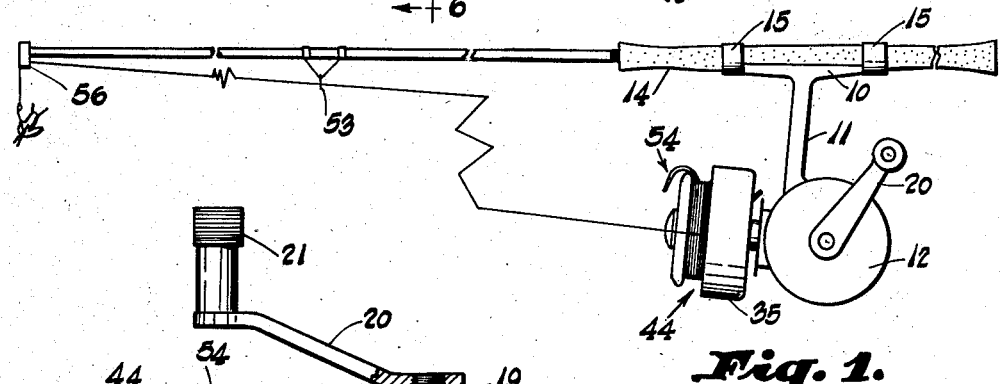
Figure 2:
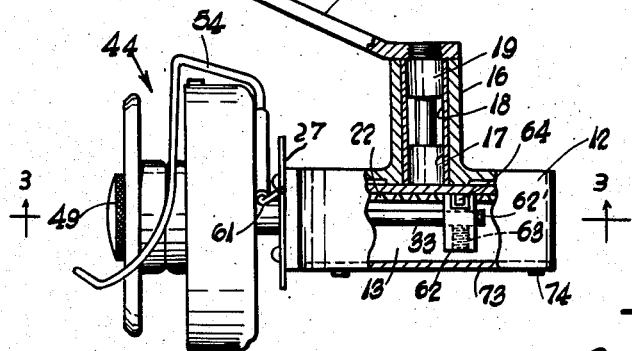
Fig. 2 represents a bottom plan view, partly in section, of the fishing reel disclosed in Fig. 1.

Referring particularly to Figs. 1, 2, and 3 of the drawings, the present invention comprises a mounting member 10 from which projects a bracket member 11, upon one end portion of which is formed a substantially cup-shaped housing 12 having a hollow chamber 13 formed therein. The present mounting member 10 is adapted to be secured to a fishing rod 14 in the usual manner with a pair of slidable sleeves 15, 15.

Referring particularly to Figs. 2 and 3, the present housing member 12 has projecting axially therefrom, a hub portion 16 which is provided with an axial bore 17 in which is force fitted a bearing sleeve 18 in which is mounted a shouldered shaft 19, the distal end portion of which has threaded thereon a crank member 20 having the usual handle piece 21 carried thereby. The other end of the shaft 19 extends into the hollow chamber 13 formed within the housing 12, and upon this end of the shaft is rigidly mounted a bevel gear 22. Meshing with the bevel gear 22 is a pinion gear 23 whose shank 30 is rotatably mounted within a cylindrical bearing member 24 which, in turn, is snugly received within an aperture 25 formed within a peripheral side wall portion of the housing 13. As may be best seen in Fig. 3, the bearing member 24 extends beyond the confines of the housing 12 and is provided with a circular shoulder 26 which is received within a recess of the housing. An apertured disk 27 positioned upon the outside portion of the bearing member is secured by screws 28, 28 to the housing which functions to retain the bearing member in its operative position. In a preferred form of the present invention, the outside diameter of the gear 23 is smaller than the inside diameter of the aperture 25 and thus, the gear may be inserted into or removed from the housing by way of this aperture 25. However, it should be understood that since the bearing member 24 has an appreciable wall thickness, the gear 23 could be shifted into the housing for the purpose of removing the same, after the sleeve member 24 had been withdrawn from the aperture 25. A thrust washer 29 is positioned between the pinion gear 23 and the inside shoulder of the bearing member 24 for the purpose of facilitating the rotation of the gear relative to the stationary bearing member.

As may be best seen in Fig. 3, the shank portion 30 of the bevel gear 23 is provided with an axial bore 31 having therein a pair of spaced bearing sleeves 32, 32 which slidingly support a reciprocal rod 33.

Figure 4:
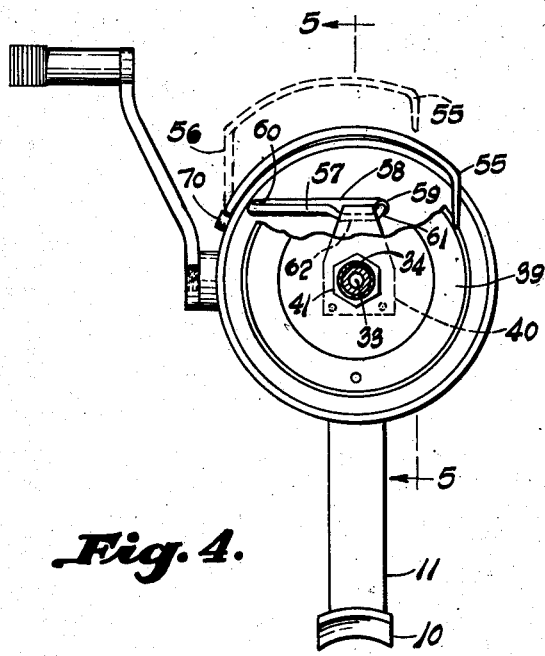
Fig. 4 represents, on a reduced scale, a sectional view taken substantially along line 4—4 of Fig. 3.
Figure 11:
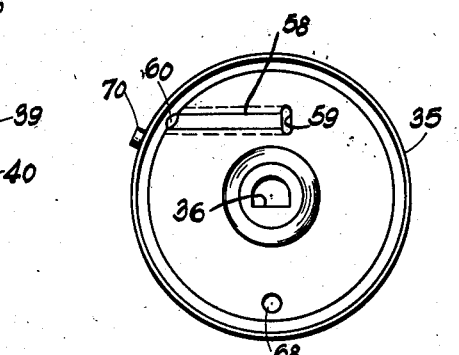
Fig. 11 represents a fragmentary view of the inside face of the flyer cup so as to illustrate the shape of its central aperture.

Referring particularly to Figs. 3 and 4, it is apparent that the shank portion 30 of the bevel gear 23 extends beyond the confines of the housing 12 and, furthermore, the distal end portion of the gear shank is threaded and formed with a slab section 34. Mounted upon the distal end of this gear shank is a cupped flyer member 35 which is provided with a D-shaped aperture 36 (see Fig. 11), the shape of which is complementary to that of the shank end of the gear 23, so that the flyer will be keyed thereon. Between the flyer and the bearing 24 is positioned a spring washer 37 and a hardened washer 38, while at the inside portion of the flyer is positioned a cover disk 39 and a spring finger 40 which are apertured so as to be received over the distal end of the gear shank 30. A nut 41 is threadedly received over the extreme end portion of the gear shank 30 for the purpose of locking the cover disk 39, the spring finger 40, and the flyer 35 in position over the gear shank. From the above, it is to be understood that any rotation of the crank 20 will impart a rotary motion to the bevel gear 22 and thus, the pinion gear 23 and the flyer 35 will rotate in response to such movements. However, it is to be particularly observed that at the juncture of the body portion of the shank 30 and its threaded end portion there is formed a shoulder 30' which extends slightly outside the confines of the bearing member 24. Also, the hardened washer 38 abuts against this shoulder 30' so that the nut 41 will not force the washer 38 against the member 24. The spring washer 37, however, is positioned upon the shoulder 30' so as to resist any relative axial movement between the bearing member 24 and the flyer assembly.

Figures 9, 10:
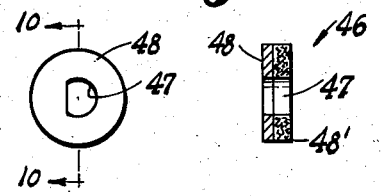
Fig. 9 represents a front elevation view of a tension washer employed in the present reel.
Fig. 10 represents a sectional view taken substantially along the line 10—10 of Fig. 9.
Figures 7, 8:
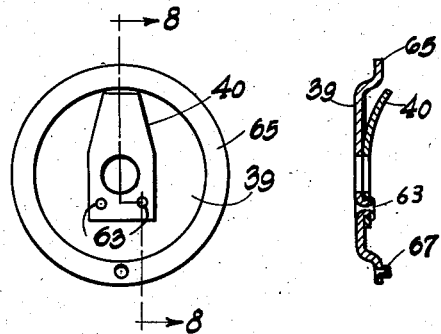
Fig. 7 represents a back face view of a disk and spring unit employed in the present reel.
Fig. 8 represents a sectional view taken substantially along the line 8—8 of Fig. 7.

Still referring to Fig. 3, the left-hand end portion of the rod 33 extends beyond the confines of the housing 12, and upon this exposed end of the rod is rigidly mounted a disk 33' having an axial shank 42. Rotatably mounted upon the shank 42 and adjacent the disk 33' is a bearing hub 43 of a line-carrying spool generally designated by the numeral 44. This hub 43 may be forced-fitted within the spool 44 and beyond the hub the shank 42 is slabbed, as at 45, and is adapted to have received thereon a friction disk element generally designated by the numeral 46. By referring particularly to Figs. 9 and 10, it is to be understood that this friction element is provided with a D-shaped aperture 47 having a shape complementary to that of the slabbed shank 42, to the end that this friction element may be slidingly received thereon and, at the same time, keyed thereto. It is to be particularly understood that this friction element is made up of two parts, section 48 which may be fabricated of any suitable material having a low coefficient of friction, such as metal or plastic, while a section 48' thereof may be fabricated of some material having a high coefficient of friction, such as felt or cork. The elements 48 and 48' are adhesively secured together, and they are mounted over the shank 42 so that the felt portion thereof will engage the hub of the spool 44. Thus, the friction disk 46 will be prevented from rotating relative to the shank 42, but, at the same time, it will be permitted to move endwise of the shank for the purpose of facilitating its removal. Threaded upon the extreme end portion of the shank 42 is a thumb nut 49 which functions to engage the friction disk and bias the same against the spool hub. From the above, it is to be understood that by adjusting the thumb nut 49, relative to the shank 42, it will be possible to adjust the friction between the rotatable spool and the stationary elements 33' and 46. Furthermore, it is apparent that any rotation of the spool cannot be effective to loosen the thumb nut from the shank 42, for the reason that the friction disk 46 is keyed to the shank, thereby preventing the rotary motion of the spool from being transferred to the thumb nut. The rod 33 is never permitted to rotate about its longitudinal axis, as will be understood from a more detailed description thereof.

Referring particularly to Fig. 3, the above-noted spool 44 is formed from a pair of separate sheet metal elements 50 and 51, of which the element 50 is provided with an annular ridge of material which is spun over the center portion of the member 51, as at 52, for the purpose of securing the two elements rigidly together. Thereafter, the bearing hub 43 is force-fitted within the spool so as to provide an antifriction mounting between the spool and the shank 42. The peripheral portions of the spool are each flared outwardly, thereby to form a spool upon which a fishing line may be wound without the danger of injurying the line.

As may be seen from Fig. 1, the mounting member 10 is adapted to be secured to a fishing rod so as to be aligned substantially longitudinally thereof, and thus, the axis of the spool 44 is disposed at a slight angle to the rod axis. A first guide ring 53 of the rod is positioned relative to the reel, so that it will be in line with the spool axis, so that the fishing line will always pay off evenly from the spool, and by the same token, be evenly rewound thereupon.

After the fishing line is cast from the spool by the angler, it thereafter becomes necessary to rewind the line upon the spool, preparatory to further casting operations. In order to wind the line back upon the spool, the present invention contemplates the use of a line-engaging finger, or pick-off member, generally designated by the numeral 54. More specifically, this pick-off member comprises an outer curved portion 55 and a line-engaging portion 56 which is disposed adjacent the periphery of the flyer element 35.

Figure 5:
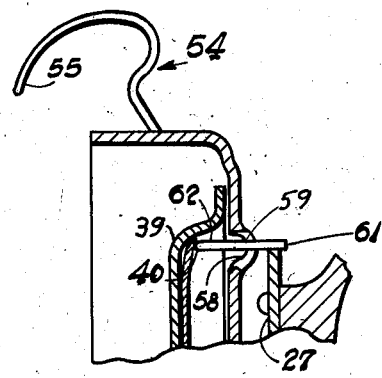
Fig. 5 represents, on an enlarged scale, a sectional view taken substantially along the line 5—5 of Fig. 4.

Referring particularly to Figs. 2, 3, 4, and 5, it is to be understood that the line-engaging portion 56 of the pick-off member normally is disposed adjacent the periphery of the flyer 35, and has a portion 57 thereof which is bent at right angles to the portion 56, so as to extend around the back face portion of the flyer element, thereby to be journalled within a groove 58 formed within the inner portion of the flyer element. A pair of apertures 59 and 60 are provided in the back face of the flyer for receiving the portion 57 of the pick-off member. Referring particularly to Fig. 4, it is to be understood that the portion 57 lies within the groove 58, and that a free end portion 61 of the pick-off member extends through the aperture 59 and beyond the confines of the flyer element. Referring to Figs. 4 and 5, there is formed adjacent the end 61 of the pick-off member a loop portion 62 which is normally biased against the inner wall of the flyer, as best illustrated in Fig. 3. The hereinabove noted spring finger 40, which is secured upon the cover disk 39 by means of rivets 63, 63, constantly engages the loop 62 of the pick-off member, thereby to bias the latter into its operative position, which is best illustrated in Figs. 3 and 4. However, it is to be understood that the pick-off member may be pivoted within the groove 58, to the end that the loop portion 62 thereof is thrown away from the back wall of the flyer element so as to be disposed at right angles thereto. Referring particularly to Fig. 5, it is to be understood that the spring element 40 will hold the end of element 61 against the periphery of the disk 27 so as to maintain the pick-off member in its inoperative position.

Figure 6:
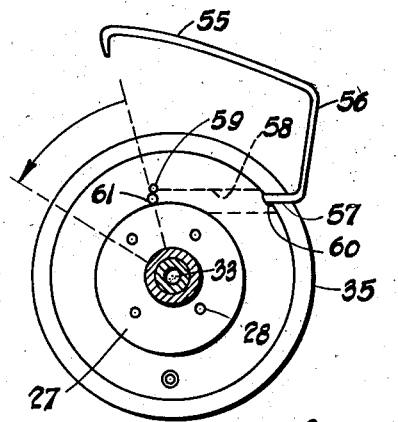
Fig. 6 represents, on a reduced scale, a sectional view taken substantially along the line 6—6 of Fig. 3.

It is apparent that whenever the pick-off member is in its operative position, it will be so disposed that its curved or line-engaging loop portion 55 will engage the fishing line as soon as the flyer 35 is rotated (see Figs. 2 and 3). Upon engaging the fishing line, the curved portion 55 will deflect the line into the crotch formed by the curved portion 55 and the line-engaging portion 56 and thereafter, further rotation of the flyer with the pick-off member will function to wind the line about the spool. Furthermore, in the event that the pick-off member is in its inoperative position, as illustrated in Figs. 4 and 5, when the angler wishes to retrieve the line, it is only necessary for him to turn the crank 21 in a line-retrieving direction, and this movement will be effective to rotate the flyer 35 so that the outwardly extending free end 61 of the pick-off member will be urged outwardly by the periphery of the disk 27 which is shaped as an eccentric cam, as may be best understood by reference to Fig. 6. Such movement of the pick-off end member 61 will function to rotate the pick-off member about the axis of its portion 57 to the end that its other end 55 will be returned to its operative position under the influence of the spring finger 40.

Experience has shown that a fishing line tends to wear through a pick-off member at that portion over which the line is payed out. Rather than provide the member with expensive antifriction means, the present member is designed so that it may be readily removed from the flyer and be replaced by a new unit. Thus, once the cover 39 and its spring finger 40 are removed from the flyer, the wire pick-off may be readily withdrawn through the apertures 59 and 60 which are made sufficiently oversize for this purpose.

The pick-off member is provided with an abutment pin 70 which is riveted or otherwise secured upon the outer periphery of the flyer cup 35 so as to prevent the pick-off member from being deformed in the event that the pull upon the fishing line becomes excessive during the winding operation. It is to be observed that this abutment pin engages the portion 56 of the pick-off member whenever the latter is in its operative position.

The present invention also contemplates the provision of means for shifting the spool axially of the rod 33, so that the line will be wound uniformly about the hub portion of the spool. For this purpose, there is mounted intermediate the ends of the rod 33 a block or crosshead member 62 which is secured to the rod by means of a set screw 63. It should be clear that the presence of the block 62 will prevent the rotation of the rod 33 about its longitudinal axis, for the reason that the block slidably engages the face of the gear 22 at all times. Provided crosswise of the rod 33 and within the rear face portion of the block 62 is a groove 62' which receives a pin 64 projecting eccentrically from the gear 22. From this, it is to be understood that rotation of the gear 22 will cause the pin 64 to rotate in synchronism therewith, to the end that the block 62, and consequently the rod 33, will reciprocate back and forth. This rectilinear motion of the rod 33 will be effective to shift the entire spool assembly back and forth relative to the pick-off member 55 and the flyer 33 and thus, as the latter two elements are rotated, it will be clear that the fishing line will be wound uniformly about the hub of the spool element.

In order to insure that the fishing line will not find its way between the peripheral portion of the spool element 50 and the inner portion of the latter, the flyer 39 during the rotation of the latter, the present invention contemplates spacing apart the two spool elements 50 and 51 a distance which is one to fifteen per cent greater than the length of the stroke of the rod 33. By thus constructing the spool in this fashion, and by adjusting the same in a proper fashion along the longitudinal axis of the rod 33, the line builds up evenly on the spool without crowding between the spool flanges, and there is no possibility of having the line being caught between the spool element 50 and the inner portions of the flyer 35. However, should the fishing line find its way to the space between the spool element 50 and the inner portion of the flyer cup 35, the cover disk 39 will prevent the line from fouling the spring finger 40 or the portions 57 and 62 of the pick-off member. More specifically, the cover disk 39 is dish shaped and its peripheral portion 65 is adapted to be seated snugly with a recess portion 66 of the flyer. Thus, the cover disk 39 completely encloses the spring finger 40, as well as the pick-off elements 57 and 62. The cover disk 39 is provided with an extension shoulder 67 which is received within an aperture 68 formed within the flyer for the purpose of preventing the cover disk from rotating about the gear shank.

From the above, it is to be understood that whenever the angler wishes to cast the line, he merely grasps the base of the curved portion 55 of the pick-off member and rotates it about its portion 57, thereby to shift the pick-off member to its inoperative position. However, in order to reposition the pick-off member in its operative position, it is merely necessary to turn the crank 20 in the usual line-retrieving direction, thereby causing the finger 61 of the pick-off member to move over the cam surface of the disk 27, to the end that the pick-off member is snapped into its operative or line-engaging position.

As hereinabove noted, the spool 44 is rotatably mounted upon the shank 42 so that it is possible to rotate the spool, if such an operation is desired. Furthermore, by means of the friction disk 33' and thumb nut 49, it is possible to adjust the friction between disk 45 and the spool hub, to the end that a predetermined drag may be applied to the spool. Thus, during the casting operation, a sufficient drag is always applied upon the spool so that it will be impossible for the same to rotate. Therefore, the elements 33' and 49 comprise clutching elements which prevent normal rotation of the spool, except when a fish is hooked and running, and at such times, the clutch allows the spool to revolve so that the fish pulls against the tension of the reel. This tension may be readily increased or decreased by the turning of the knob 49.

Referring to Figs. 1, 2, and 3, the housing 12 is provided with three inner bosses 71, 71 which are provided with threaded apertures 72, 72. A cover 73 is adapted to be disposed over and against these bosses 71, 71 and three screws 74, 74 secure the cover 73 in sealing relation over the open housing face. The removal of this cover 73 is readily accomplished by taking out the screws 74, so that the chamber 13 is entirely exposed, as shown in Fig. 3. The open chamber permits ready inspection and cleaning of the gearing located within the housing 12, without any possibility of displacing any of the parts of the driving mechanism, as a result of the removal of the cover 73.

From the above, it is to be understood that the present fishing reel is particularly designed so as to make for inexpensive manufacture, although, at the same time, the reel presents a most efficient and serviceable unit.

I claim:

1. In a fishing reel having a housing, driving means disposed within said housing and having a rotatable element thereof extending out of said housing, a cup-shaped flyer mounted upon the distal end of said rotatable element so as to be driven thereby, a reciprocable rod extending from said housing through said rotatable element and being actuated by said driving means, and a line-carrying spool mounted upon said rod and within said flyer; line-engaging means carried by said flyer, said line-engaging means comprising a wire pick-off member having its inner end portion pivotally mounted upon the back wall of said flyer, a portion of said inner end of said pick-off member extending into said flyer, spring means carried within said flyer for releasably maintaining said pick-off in either of two extreme positions, and a cover disk mounted upon said rotatable element and adjacent the inside back wall portion of said flyer so as to cover said spring and that portion of said pick-off which extends into said flyer.

2. In a fishing reel having a housing, driving means disposed within said housing and having a rotatable element thereof extending out of said housing, a cup-shaped flyer mounted upon the distal end of said rotatable element so as to be driven thereby, a reciprocable rod extending from said housing through said rotatable element and being actuated by said driving means, and a line-carrying spool mounted upon said rod and within said flyer; line-engaging means carried by said flyer, said line-engaging means comprising a wire pick-off member having its inner end portion pivotally mounted upon the back wall of said flyer, a portion of said inner end of said pick-off member extending into said flyer, a cover disk mounted upon said rotatable element and adjacent the inside back wall portion of said flyer so as to cover that portion of said pick-off which extends into said flyer, and a spring means carried upon said cover disk and being disposed between said cover disk and the back wall portion of said flyer, said spring means being in engagement with said pick-off member for releasably maintaining the latter in either of two extreme positions.

3. In a fishing reel having a line-carrying spool, a substantially cup-shaped rotatable flyer associated with said spool, and means for rotating said flyer relative to said spool; line-engaging means carried by said flyer, said line-engaging means comprising a wire pick-off member having its inner end portion pivotally mounted upon the back wall of said flyer and about a rotative axis disposed substantially crosswise of the flyer axis, a portion of said inner end of said pick-off member extending into said flyer, and spring means carried within said flyer for releasably maintaining said pick-off in either of two extreme positions of rotative movement, the intermediate portion of said pick-off member extending substantially at right angles to its inner end portion and adjacent the periphery of said flyer to terminate at its outer free end in a line-engaging loop.

4. In a fishing reel having a housing, driving means disposed within said housing, a line-carrying spool associated with said housing, and a substantially cup-shaped rotatable flyer surrounding said spool and connected with said driving means; line-engaging means carried by said flyer, said line-engaging means comprising a wire pick-off member having its inner end portion pivotally mounted upon the back wall of said flyer and about a rotative axis disposed substantially crosswise of the flyer axis, a portion of said inner end of said pick-off member extending into said flyer, spring means carried within said flyer for releasably maintaining said pick-off in either of two extreme positions of rotative movement, the extreme inner end portion of said pick-off member being bent substantially at right angles to its pivotal axis and extending away from said flyer, and a cam element carried upon said housing so that engagement between said extreme inner end portion of said pick-off member and said cam incident to a rotation of said flyer will cause said pick-off member to be rotated about its pivotal axis and into its operative position.

5. In a fishing reel having a line-carrying spool, a substantially cup-shaped rotatable flyer associated with said spool, and means for rotating said flyer relative to said spool; line-engaging means removably carried by said flyer, said line-engaging means comprising a unitary wire pick-off member having its inner end portion pivotally mounted within a pair of spaced apertures provided within the back wall of said flyer so that the rotative axis of the wire is disposed substantially crosswise of the flyer axis, the portion of said inner end of said pick-off member between the apertures extending into said flyer, and spring means carried within said flyer for releasably maintaining said pick-off in either of two extreme positions of rotative movement, the intermediate portion of said pick-off member extending substantially at right angles to its inner end portion and adjacent the periphery of said flyer to terminate at its outer free end in a line-engaging loop.

6. In a fishing reel having a housing, driving means disposed within said housing, a line-carrying spool associated with said housing, and a substantially cup-shaped rotatable flyer surrounding said spool and connected with said driving means; line-engaging means carried by said flyer, said line-engaging means comprising a wire pick-off member having its inner end portion pivotally mounted upon the back wall of said flyer and about a rotative axis disposed substantially crosswise of the flyer axis, a portion of said inner end of said pick-off member extending into said flyer, and spring means carried within said flyer for releasably maintaining said pick-off in either of two extreme positions of rotative movement, the extreme inner end portion of said pick-off member being bent substantially at right angles to the pivotal axis thereof and extending generally away from said flyer so that engagement between this end of the wire and said housing incident to a rotation of said flyer will cause said pick-off member to be rotated about its pivotal axis and into its operative position.

EDWIN E. VINCENT.

REFERENCES CITED

The following references are of record in the file of this patent:

UNITED STATES PATENTS

| Number | Name | Date |
|---|---|---|
| 1,187,840 | Illingworth | June 20, 1916 |
| 2,229,470 | Pezon | Jan. 21, 1941 |
| 2,434,479 | Allen | Jan. 13, 1948 |
| 2,498,987 | Duncan | Feb. 5, 1950 |
| 2,545,080 | Graham | Mar. 13, 1951 |

FOREIGN PATENTS

| Number | Country | Date |
|---|---|---|
| 409,833 | Great Britain | May 10, 1934 |
| 598,126 | Great Britain | Feb. 11, 1948 |
| 887,877 | France | Aug. 23, 1943 |